March 23, 1937. B. L. YORK 2,074,500
MOLD FOR FROZEN CONFECTIONS
Filed May 22, 1936
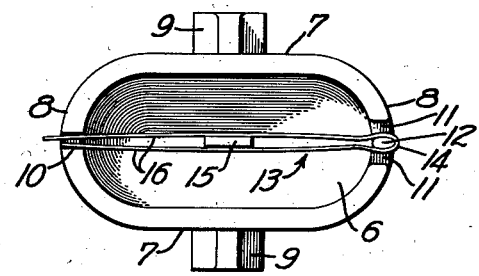
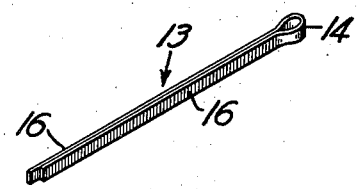
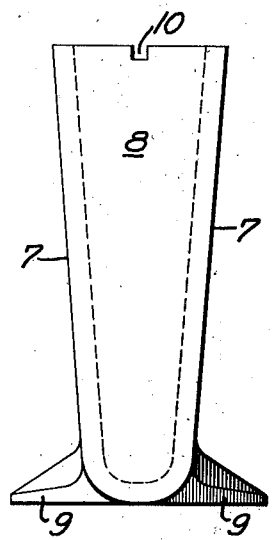 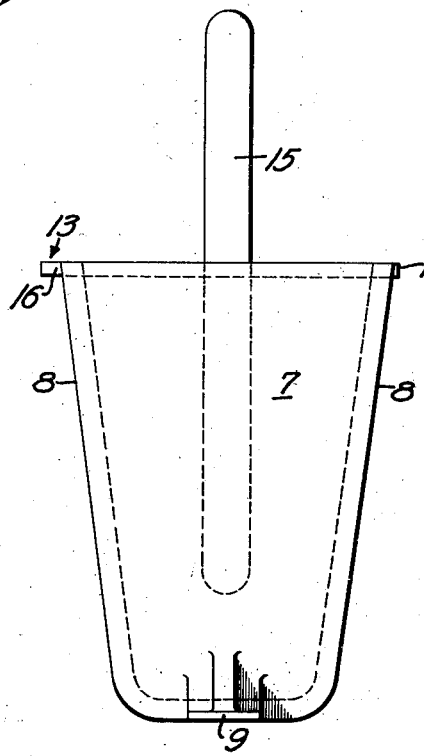 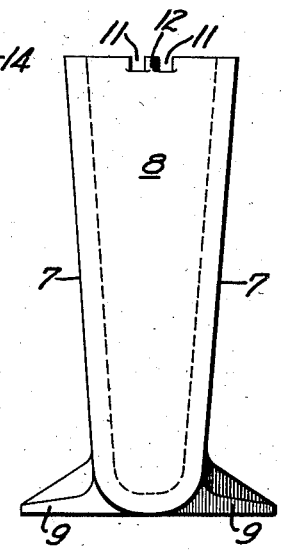
INVENTOR
Bertrand L. York
BY
Harry C. Schweda
ATTORNEY Patented Mar. 23, 1937

2,074,500

UNITED STATES PATENT OFFICE 2,074,500

MOLD FOR FROZEN CONFECTIONS

Bertrand L. York, Piedmont, Calif.

Application May 22, 1936, Serial No. 81,185

1 Claim. (Cl. 107—19)

This invention relates to a device for molding frozen confections and more particularly to improved means for supporting and positioning in the mold an insert to be attached to the confection when the latter is frozen.

It is an object of the invention to provide an inexpensive mold in which frozen confections of the lollypop type may be made in the freezing compartments of domestic mechanical refrigerators.

Another object of the invention is to provide simple and effective means for securely supporting in the mold a handle member for the type of confection above referred to.

The invention possesses other objects and features of value, some of which, together with the foregoing, will be specifically set forth in the specification hereunto annexed. It is to be understood that the invention is not to be limited to the particular species thereof shown and described as various other embodiments thereof may be employed within the scope of the appended claim.

Referring to the drawing:

Figure 1 is a top plan view of the complete mold showing an insert positioned therein.

Figure 2 is a front elevational view of the structure shown in Figure 1.

Figures 3 and 4 are each side elevational views of the mold.

Figure 5 is a perspective view of the insert supporting clip.

In detail, the invention comprises a mold having a recess 6 therein provided with converging side and end walls 7 and 8 respectively, and a pair of feet 9 which stabilize the mold when the latter is placed in upright position on a surface. The side walls of the recess are tapered to provide draft so that the confection frozen in the mold may be readily separated therefrom. The upper rim of the mold is provided with a notch 10, and at a position on the rim directly opposite the notch 10, with a pair of spaced notches 11 which provide a lug 12.

A clip 13, composed of a length of tempered metal strip doubled upon itself to provide an eye 14 which, as is shown in Figure 1, is adapted to surround and frictionally engage the lug 12, is provided for supporting, in upright position in the recess 6, an insert which may be a strip 15 of wood or other material which is frozen into the confection to provide a handle therefor. The strip 15 is placed between the parallel portions 16 of the clip, the latter being spread apart slightly thereby, and the free ends of the portions 16 are pressed together and seated in the notch 10 where they will exert pressure against the sides of the notch and be frictionally held firmly in position.

The mold so prepared may be nearly filled with flavored and colored fluid, and placed in the freezing compartment of a mechanical refrigerator until the fluid congeals, whereupon by removing the clip 13 from the mold and holding the latter momentarily in a stream of water to slightly heat the mold, the confection, with the handle insert 15 frozen thereinto, may be readily removed from the mold.

If it is desired that the insert 15 be molded into the confection in a position other than that wherein it would be located if the clip were attached to the mold in the prescribed manner, the clip with the insert attached thereto may be laid loosely on the rim of the mold in any position to place the insert in the desired location.

It will be seen that both the mold and the clip are very simple in construction, and may be produced at low cost, thereby permitting the use of one or more of the devices in most every home.

I claim:

The combination of a mold body having integral side and end walls to provide a recess having a bordering rim, said rim having a notch therein, a lug positioned on said rim at a point opposite said notch, and means for engaging and supporting an object within said recess, said means comprising a strip of flexible material doubled upon itself to provide a member having a loop at one end thereof adapted to encircle and frictionally engage said lug, and at its other end to frictionally engage said mold body within said notch.

BERTRAND L. YORK.